United States Patent Office.

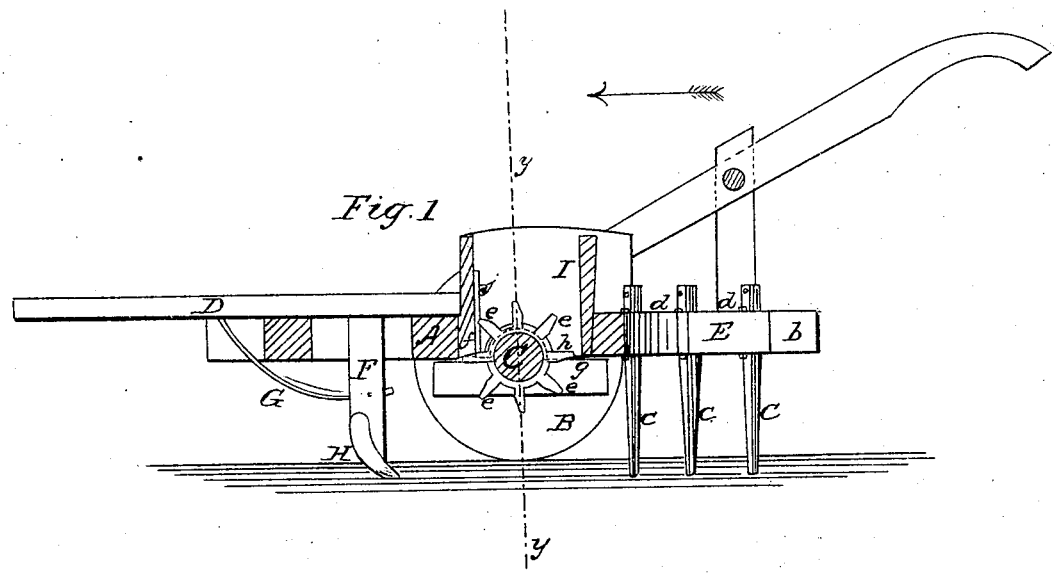
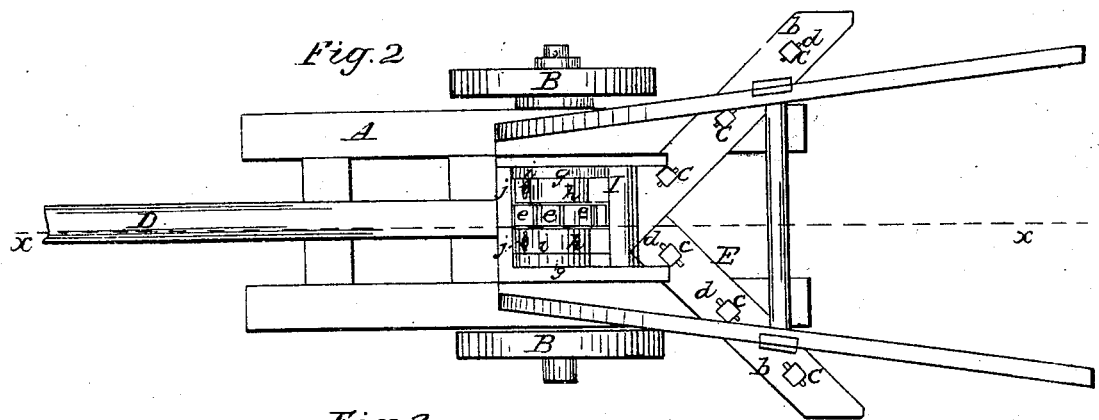
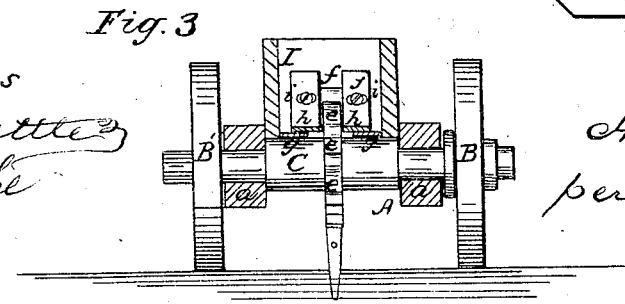

A. J. GOING, M. D., OF CLINTON, LOUISIANA.

*Letters Patent No. 75,410, dated March 10, 1868.*

IMPROVEMENT IN COTTON-SEED PLANTERS.

*The Schedule referred to in these Letters Patent and making part of the same.*

TO ALL WHOM IT MAY CONCERN:

Be it known that I, A. J. GOING, M. D., of Clinton, in the parish of East Feliciana, and State of Louisiana, have invented a new and improved Cotton-Seed Planter; and I do hereby declare that the following is a full, clear, and exact description thereof, which will enable those skilled in the art to make and use the same, reference being had to the accompanying drawings forming part of this specification.

This invention relates to a new and improved machine for planting cotton-seed, and it consists in a peculiar construction and arrangement of parts pertaining to the seed-distributing apparatus, whereby the seed may be sown with certainty, and without the liability of the hopper becoming choked or clogged. The invention also consists in using, in combination with the seed-distributing apparatus above alluded to, a furrow-opener and seed-covering device, constructed and arranged as hereinafter fully shown and described. In the accompanying sheet of drawings—

Figure 1 is a side sectional view of my invention, taken in the line $x\,x$, fig. 2.

Figure 2, a plan or top view of the same.

Figure 3, a detached vertical transverse section of the hopper, taken in the line $y\,y$, fig. 1.

Similar letters of reference indicate corresponding parts.

A represents a rectangular frame, which is mounted on the wheels B B', the axle C being fitted in suitable bearings $a\,a$, secured to the under side of the frame, A, about at its centre. The wheel B' is permanently attached to its axle, the other, B, being loosely fitted thereon. D is the draught-pole, attached to the front end of the frame A, and E is a harrow, secured to the rear part of said frame; the harrow being composed of two oblique bars $b\,b$, framed into the side pieces of the frame, A, in V-form, and having iron or steel teeth $c$, fitted vertically into them; the teeth being capable of adjustment vertically, and secured at any desired point by pins $d$, which may be passed through any of a series of holes made horizontally through them, (see fig. 1.) The draught-pole D, near its rear end, has a pendent-bar, F, framed into it, which is braced from the draught-pole by a curved iron rod, G. To the lower end of the bar F, a furrow-opener, H, is attached, the latter being of iron or steel, and having its front edge curved like the front part of a sled-runner, as shown clearly in fig. 1. On the axle C, about at its centre, there is keyed a hub, having a series of radial arms, $e$, projecting from it, said arms being bevelled at their outer ends and rear sides, as shown in fig. 1. Any proper number of these arms may be used, according to the size of the machine. I represents a hopper, which is secured on the frame A, and within the lower part of which the arms $e$ work or rotate, an oblique slot or opening, $f$, being made in the front side of the hopper for the arms to work through.

The bottom of the hopper I is peculiarly constructed as follows: Two sheet-metal strips $g\,g$ are attached permanently to it, longitudinally with the frame A, the space between the strips being considerably wider than the arms $e$, in which space said arms work. Over these strips $g\,g$ there are placed similar sheet-metal strips $h\,h$, which are attached or applied in such a manner that they may be adjusted laterally, (see fig. 3,) oblong slots $i$ being made in the front ends of $h$, through which screws $j$ pass into the front side of the hopper.

By this arrangement the capacity of the discharge-opening $f$ may be regulated, so as to increase or diminish the discharge of seed as circumstances may require. This is a very important feature, for the condition of cotton-seed when being planted varies very materially. It is always encompassed by a fibre, which causes the seed to adhere, more or less, to each other, and if the fibre be slightly moist, the seed are liable to stick together very tenaciously, and the hopper frequently choked or clogged thereby. When the seed is in this condition, the strips $h\,h$ are adjusted quite far apart, so as to allow a free discharge. If the fibre of the seed be quite dry, the strips $h\,h$ are adjusted much nearer together.

In consequence of having the strips $g\,g$, $h\,h$ of iron or metal, a great advantage is obtained, for the strips in this case may be quite thin, and still have the requisite degree of strength and firmness. Metal also has a tendency to separate the seed under the action of the rotating arms $e$. The fibre will not adhere to it, and the seed will not pass down between the sides of the arms $e$ and the edges of the strips, and become wedged therein, as would be the case with a comparatively thick wooden bottom. The arms $e$, as they rotate, catch the seed and draw it down through the discharge-opening $f$, the seed being detached or separated in being forced between the front part of the strips $h\ h$, the seed dropping into the furrow made by the opener F, while the harrow-teeth $c$ cover the same.

Having thus described my invention, I claim as new, and desire to secure by Letters Patent—

1. The fixed metallic strips $g\ g$, in combination with the laterally-adjustable metallic strips $h\ h$, placed at the bottom of the hopper I, and the radial arms $e$, attached to the axle C, and working between the strips $g\ g$, $h\ h$, all constructed and arranged for joint operation, substantially in the manner as and for the purpose set forth.

2. The furrow-opener H and harrow F, in combination with the cotton-seed distributing mechanism, all constructed, arranged, and applied for joint operation, substantially as and for the purpose specified.

The above specification of my invention signed by me, this twenty-third day of November, 1867.

A. J. GOING, M. D.

Witnesses:
　J. B. TAYLOR,
　E. RANDLE.